United States Patent
Li et al.

(10) Patent No.: US 8,200,012 B2
(45) Date of Patent: Jun. 12, 2012

(54) IMAGE DETERMINATION APPARATUS, IMAGE SEARCH APPARATUS AND COMPUTER READABLE RECORDING MEDIUM STORING AN IMAGE SEARCH PROGRAM

(75) Inventors: Jilin Li, Shanghai (CN); Zhi-Gang Fan, Shanghai (CN); Yadong Wu, Shanghai (CN); Bo Wu, Shanghai (CN)

(73) Assignee: Sharp Kabushiki Kaisha, Osaka (JP)

( * ) Notice: Subject to any disclaimer, the term of this patent is extended or adjusted under 35 U.S.C. 154(b) by 663 days.

(21) Appl. No.: 12/393,772

(22) Filed: Feb. 26, 2009

(65) Prior Publication Data
US 2009/0263025 A1 Oct. 22, 2009

(30) Foreign Application Priority Data

Apr. 21, 2008 (CN) .......................... 2008 1 0090491

(51) Int. Cl.
*G06K 9/34* (2006.01)
(52) U.S. Cl. ...................... 382/173; 382/176; 382/177
(58) Field of Classification Search .................. 382/173, 382/176, 177, 178, 190–206, 209, 217–220, 382/256, 266, 276, 280
See application file for complete search history.

(56) References Cited

U.S. PATENT DOCUMENTS
7,366,620 B2 * 4/2008 Yamaguchi et al. ............ 702/40

FOREIGN PATENT DOCUMENTS
| JP | 62-137680 A | 6/1987 |
| JP | 2005-301722 | 10/2005 |
| JP | 2008-11135 | 1/2008 |

* cited by examiner

*Primary Examiner* — Brian Le
(74) *Attorney, Agent, or Firm* — Birch, Stewart, Kolasch & Birch, LLP

(57) ABSTRACT

A preprocessing section binarizes input image data and calculates a total black pixel ratio. A feature extracting section detects connected components contained in the binarized image data and detects circumscribing bounding boxes that circumscribe these connected components, respectively. Based on sizes of the circumscribing bounding boxes detected and numbers of black pixels contained therein, predetermined connected components are removed. A determining section generates an edge map by using the residual connected components, and performs two-dimensional fast Fourier transform thereon to generate spectral data. The determining section performs two-dimensional fast Fourier transform on template images to generate spectral data. The determining section determines, based on these pieces of spectral data, whether or not a circular shape is contained in the input image data.

6 Claims, 8 Drawing Sheets

IMAGE DETERMINATION APPARATUS, IMAGE SEARCH APPARATUS AND COMPUTER READABLE RECORDING MEDIUM STORING AN IMAGE SEARCH PROGRAM

CROSS-REFERENCE TO RELATED APPLICATION

This application claims priority to Chinese Patent Application No. 200810090491.8, which was filed on Apr. 21, 2008, the contents of which are incorporated herein by reference in its entirety.

BACKGROUND OF THE INVENTION

1. Field of the Invention

The present invention relates to an image determination apparatus for determining whether or not an image portion having a specific shape is contained in inputted image data, to an image search apparatus and to a computer readable recording medium storing an image search program.

2. Description of the Related Art

There are image forming apparatuses such as a copy machine, a facsimile machine, a printer, and a multifunctional peripheral having multiple functions thereof, which have functions of storing image data such as an inputted document image in a mass-capacity storage device and reading out and reprinting registration image data that has been inputted once at any time.

The function of reprinting is convenient. However, as an amount of the registered data increases, it is difficult to find data to be outputted. Accordingly, image search technology for searching for desired image data from a plurality of pieces of image data becomes important.

As an example of target image data for search, there is image data in which an image portion having a specific shape is contained. The term "specific shape" as used herein refers to the special mark having a specific shape such as a circle, a triangle or a quadrangle. In many cases, the circle in particular is a seal image and becomes a target for search. Therefore, techniques to determine whether or not an image portion circular in shape is contained are being developed. For example, the related art is disclosed in JP-A 62-137680 (1987).

Detection of a circular shape includes two main steps. As a first step, an edge that forms the circumference of a circle is detected. And as a next step, central coordinates and so on are determined based on the edge detected. Through these steps, the circle detection is performed.

For the detection of a circular shape, Hough transform is most commonly employed.

On the occasion of the detection of a circular shape, values to be determined are central coordinates and a radius. Consequently, the variable space becomes three dimensions including coordinates (x, y) and a radius r, and enormous computing quantity and storage capacity are required.

With the intention of resolving these problems, various detection methods which are improvements of Hough transform have been developed. However, sufficiently high detection accuracy still has not been achieved in the cases of containing, for example, complex images in the background of a circular image.

As other detection methods, there are a method of detecting a circular shape as a nonlinear curve without edge detection, a method of detecting a seal portion by a difference in colors between the seal portion and the other portions, and so on.

However, the detection as a nonlinear curve still requires enormous computing quantity and storage capacity, and the detection based on a difference in colors produces a problem in actual use because seal portions are various in their colors.

As mentioned above, the conventional methods for detecting a circular shape require enormous computing quantity and storage capacity. In addition, they have another problem that the image data used for detection is required to be free of stains and the like and to have a background image without a pattern.

SUMMARY OF THE INVENTION

An object of the invention is to provide an image determination apparatus that can realize not only reduction in computing quantity required for determination processing but also improvement in determination accuracy. Another object thereof is to provide an image search apparatus that can realize not only reduction in time required for search processing but also improvement in search accuracy and a computer-readable recording medium storing an image search program.

The invention provides an image determination apparatus for determining whether or not an image portion having a specific shape is contained in input image data, comprising:

a binarization processing section that converts input image data into binary image data by binarization;

a feature extracting section that detects connected components contained in the binary image data, each of which is a group of pixels having the same color and gathering in a connected state, detects circumscribing bounding boxes that circumscribe the connected components, respectively, removes predetermined connected components from all the connected components based on the sizes of the circumscribing bounding boxes and the numbers of black pixels in the circumscribing bounding boxes, and extracts the residual connected components as candidate connected components; and an image determination section that determines whether or not the image portion having the specific shape is contained in the input image data based on spectral data corresponding to the input image data and spectral data corresponding to each of plural pieces of template image data, wherein, while the spectral data corresponding to the input image data is generated by carrying out detection of edges on the extracted candidate connected components, generating distribution data of edge pixels contained in the binary image data and subjecting the generated distribution data to two-dimensional fast Fourier transform, the spectral data corresponding to each of plural pieces of template image data is generated by creating plural pieces of template image data having specific shapes geometrically similar but different in size, and subjecting each of the plural pieces of created template image data to two-dimensional fast Fourier transform.

According to the invention, input image data is binarized first in a binarization processing section.

In a feature extracting section, connected components contained in the binarized image data are detected, and circumscribing bounding boxes that circumscribe the connected components, respectively, are detected. In the detected circumscribing bounding boxes, based on the sizes of the detected circumscribing bounding boxes and the numbers of black pixels therein, predetermined connected components are removed from all the connected components. The connected components remaining after removal of unnecessary connected components are extracted as candidate connected components.

In an image determination section, while spectral data corresponding to the input image data is generated by two-dimensional fast Fourier transform, spectral data corresponding to each of plural pieces of template image data having a specific shape is generated by two-dimensional fast Fourier transform. Based on the generated pieces of spectral data, whether or not an image portion having the specific shape is contained in the input image data is determined.

By carrying out screening of the connected components in the feature extracting section, unnecessary elements are removed in advance and the computing quantity in the determination processing is reduced, thereby realizing reduction of the time required for determination processing. In addition, connected components which cause false determination are removed in advance, whereby determination accuracy can be improved.

Further, since determination is made by use of the spectral data generated by two-dimensional fast Fourier transform, the determination can be performed with high accuracy even when input image data is accompanied by a complicated background image.

Further, in the invention, it is preferable that the image determination section superimposes the spectral data corresponding to the input image data upon the spectral data corresponding to each template image data, calculates a coefficient of correlation between the input image data and the template image data is calculated by applying the inverse transform of the two-dimensional fast Fourier transform to the superimposed spectral data and determines, based on the calculated coefficient of correlation, whether or not an image portion having the specific shape is contained in the input image data.

According to the invention, those two pieces of spectral data are superimposed upon each other and the result of inverse transform of the superimposed spectral data is used for performing determination, and accordingly determination accuracy can be further improved.

Further, in the invention it is preferable that the specific shape is a circular shape and the plural pieces of template image data are plural pieces of image data in which circular shapes having different radii are contained, respectively.

According to the invention, a circular shape, as typified, e.g., by a seal, is important as the specific shape to be determined, and the invention can ensure highly accurate determination of a circular shape.

Furthermore, the invention provides an image search apparatus for searching for image data similar to input image data from among pre-registered image data, comprising:

a binarization processing section that converts input image data into binary image data by binarization;

a feature extracting section that detects connected components contained in the binary image data each of which is a group of pixels having the same color and gathering in a connected state, detects circumscribing bounding boxes that circumscribe the connected components, respectively, removes predetermined connected components from all the connected components based on the sizes of the circumscribing bounding boxes and the numbers of black pixels in the circumscribing bounding boxes, and extracts the residual connected components as candidate connected components;

an image determination section that determines whether or not the image portion having the specific shape is contained in the input image data based on spectral data corresponding to each of the input image data and spectral data corresponding to each of plural pieces of template image data, wherein, while the spectral data corresponding to the input image data is generated by carrying out detection of edges on the extracted candidate connected components, generating distribution data of edge pixels contained in the binary image data and subjecting the generated distribution data to two-dimensional fast Fourier transform, the spectral data corresponding to each of plural pieces of template image data is generated by creating plural pieces of template image data having specific shapes geometrically similar but different in size, and subjecting each of the plural pieces of created template image data to two-dimensional fast Fourier transform;

a search section that searches for image data having an image portion similar to the image portion of the specific shape contained in the input image data based on determination result in the image determination section; and a display section that displays image data similar to the input image data, searched from among the pre-registered image data based on search result in the search section.

According to the invention, the search section searches for image data having an image portion similar to the image portion of the specific shape contained in the input image data based on determination result in the image determination section, and displays the search result in the display section.

The image determination section realizes reduction of computing quantity in the determination processing and improvement of determination accuracy, and thereby reduction in computing quantity required for search processing and improvement of search processing can be achieved.

Further, in the invention, it is preferable that the pre-registered image data is distinguished, when it is registered, by whether or not it has an image portion of the specific shape, and template image data showing the specific shape contained in the input image data is determined, the image determination section outputs information about the template image data showing the specific shape contained in the input image data, and the search section searches based on the information about template image data contained in determination result in the image determination section and the information about the template image data decided in advance in relation to the pre-registered image data.

According to the invention, since the information about the template image data showing the specific shape is determined in advance in relation to the pre-registered image data and the image determination section outputs information about template image data of the input image data, comparison between them realizes easy search.

Furthermore, the image search program may be provided for making a computer function as the image search apparatus.

Furthermore, the invention provides a computer-readable recording medium storing an image search program for making a computer function as the image search apparatus.

According to the invention, it is possible to provide an image search program and a computer-readable recording medium storing the image search program.

BRIEF DESCRIPTION OF DRAWINGS

Other and further objects, features, and advantages of the invention will be more explicit from the following detailed description taken with reference to the drawings wherein.

DETAILED DESCRIPTION

Figure 1:
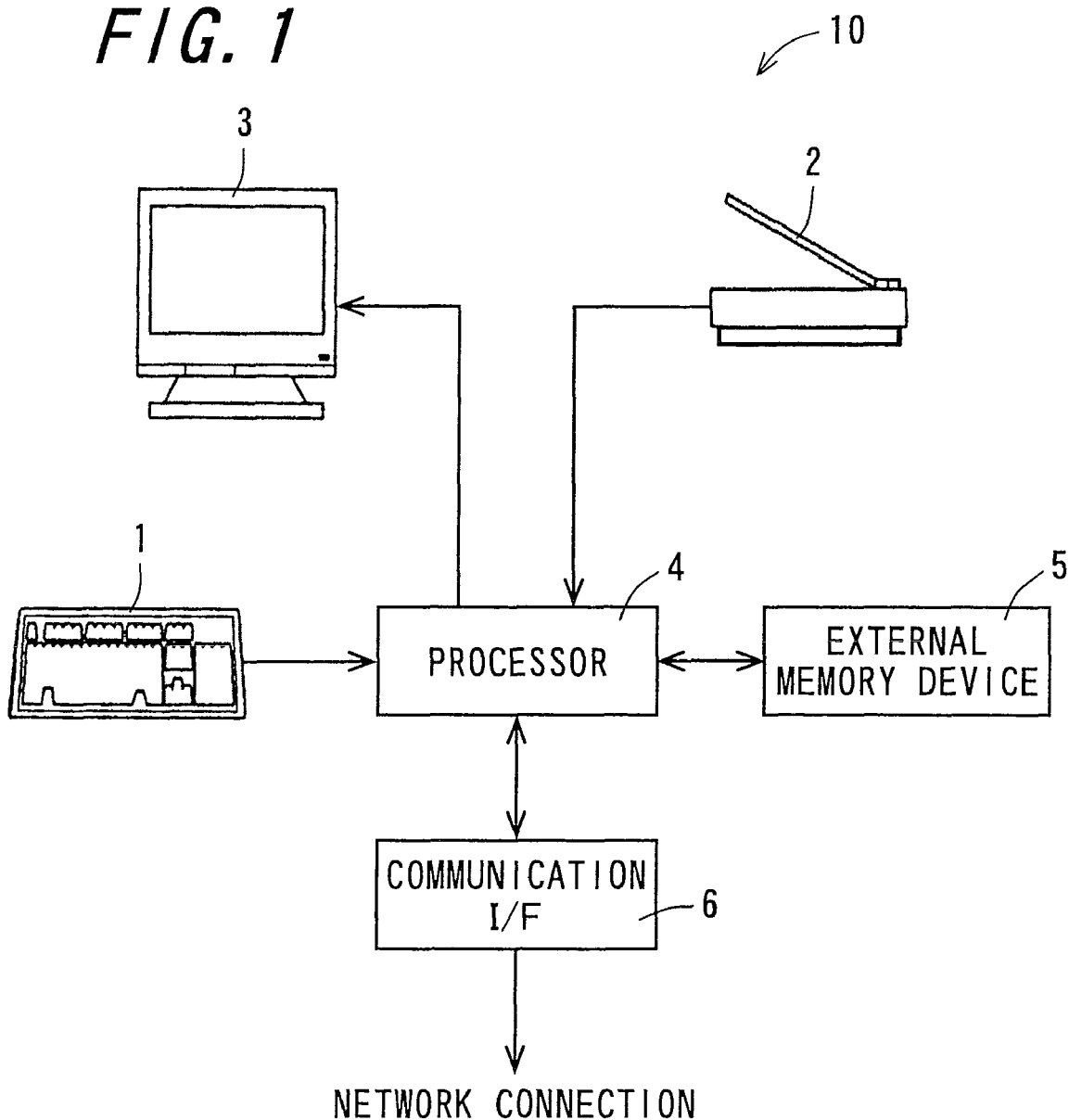
FIG. 1 is a block diagram showing a mechanical configuration of an image search apparatus.

Now referring to the drawings, preferred embodiments of the invention are described below.

FIG. 1 is a block diagram showing a mechanical configuration of an image search apparatus 10. The image search apparatus 10 includes a processor 4 and an external memory device 5 storing software for actual processing of the processor 4 and so on.

The processor 4 performs determination processing to determine whether or not an image portion having a specific shape such as a circular shape (a specific image portion) is contained in image data inputted (hereinafter referred to as "input image data") and, based on the determination result, further performs image search processing for searching for image data having the specific image portion from plural pieces of pre-registered image data (hereinafter referred to as "registration image data") and displaying. The actual processing in the processor 4 is carried out using software stored in the external memory device 5. The processor 4 is mainly composed of, e.g., a commonly used computer main body or the like.

The external memory device 5 can be mainly composed of, e.g., a hard disk that can be accessed at high speed. Alternatively, the external memory device 5 may be configured to use a large-capacity device such as an optical disc for the purpose of retaining large quantities of registration image data. On the other hand, temporary data and the like generated at each stage of determination processing and search processing steps may be stored in the external memory device 5 or semiconductor memory built into the processor 4.

To the processor 4, both a keyboard 1 and a display device 3 are connected. The keyboard 1 is used, e.g., for inputting instructions for implementing software of various kinds.

The display device 3 displays images based on input image data and registration image data, search results, and so on.

To the processor 4, an image scanner 2 is further connected. The image scanner 2 is used for reading source documents on which images are printed and capturing the input image data.

Capture of input image data can be made by not only the inputting from the image scanner 2 but also data communications from other devices on a network via a communication I/F (interface) 6. The communication I/F 6 can be implemented via a LAN card for connecting to LAN (Local Area Network), a modem card for performing data communications by connecting to a public switched telephone network, or so on.

Figure 2:
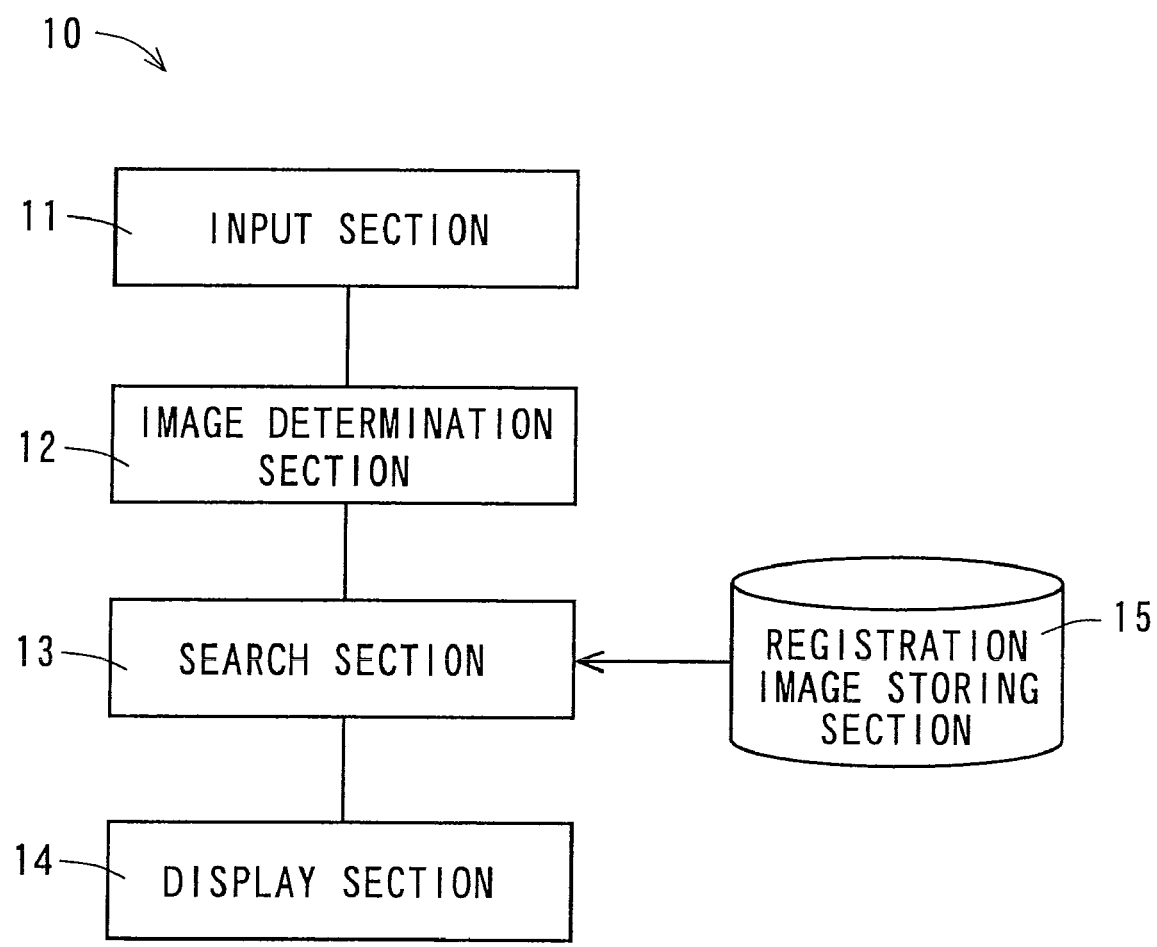
FIG. 2 is a block diagram showing a functional configuration of the image search apparatus.

FIG. 2 is a block diagram showing a functional configuration of an image search apparatus 10.

The image search apparatus 10 includes an input section 11, an image determination section 12, a search section 13, a display section 14 and a registration image storing section 15. The input section 11 inputs image data and registration image data. In the hardware configuration shown in FIG. 1, the image scanner 2 and the communication I/F 6 correspond to the input section 11 from the functional point of view. The registration image data is image data inputted in advance of the entry of input image data, and stored in the registration image storing section 15.

Figure 3:
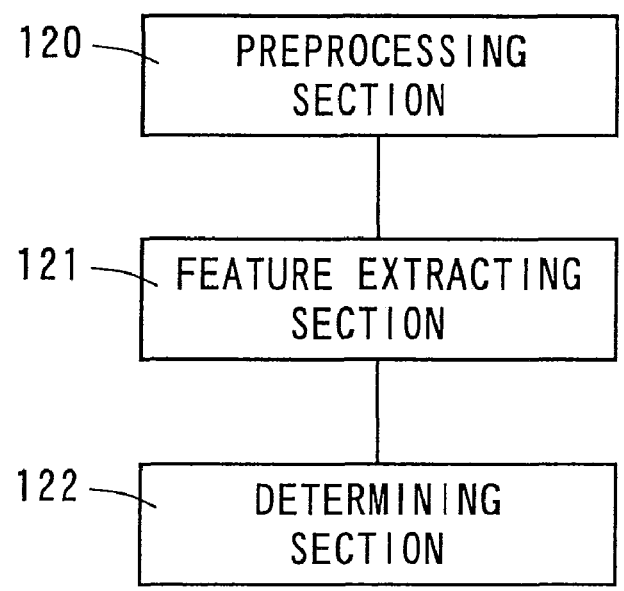
FIG. 3 is a block diagram showing a functional configuration of an image determination section shown in FIG. 2.

FIG. 3 is a block diagram showing a functional configuration of the image determination section 12 shown in FIG. 2. The following is a description about the case of determining whether or not the specific image portion having a circular shape as the specific shape is contained.

The image determination section 12 includes a preprocessing section 120, a feature extracting section 121 and a determining section 122.

In the image determination section 12, whether or not the specific image portion having a circular shape is contained in the image data inputted by the input section 11 is determined, and the determination result is outputted to the search section 13 in the subsequent stage. In the search section 13, image data containing specific image portions similar to the specific image portion contained in the input image data is searched from among the registration image data.

Figure 4:
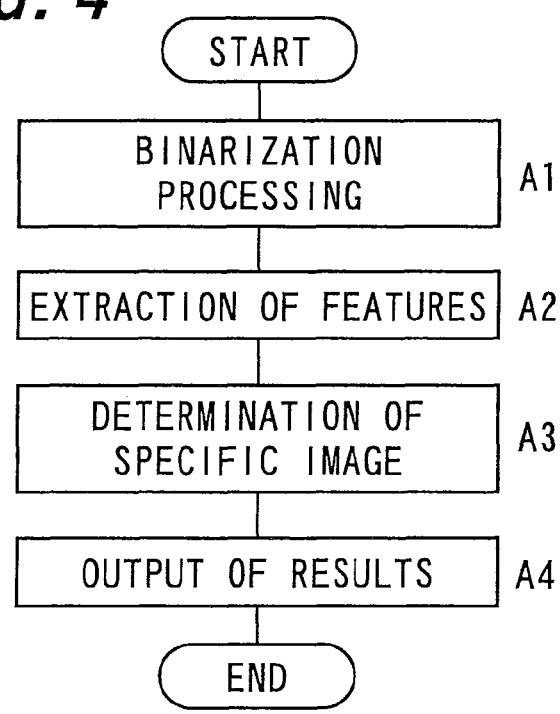
FIG. 4 is a flowchart illustrating a determination processing in the image determination section.

FIG. 4 is a flowchart illustrating the determination processing in the image determination section 12. At step A1, preprocessing including binarization processing and distortion correction is given to the input image data in the preprocessing section 120. At step A2, detection of circumscribing bounding boxes that circumscribe connected components, respectively, and screening of circumscribing bounding boxes are made based on the binarized image data in the feature extracting section 121, and thereby connected components as candidates for the circular shape are chosen. At step A3, whether or not the circular shape is contained in the input image data is determined in the determining section 122, and at step A4, the determination result is outputted to the search section 13.

Each step is illustrated below in detail.

Figure 5:
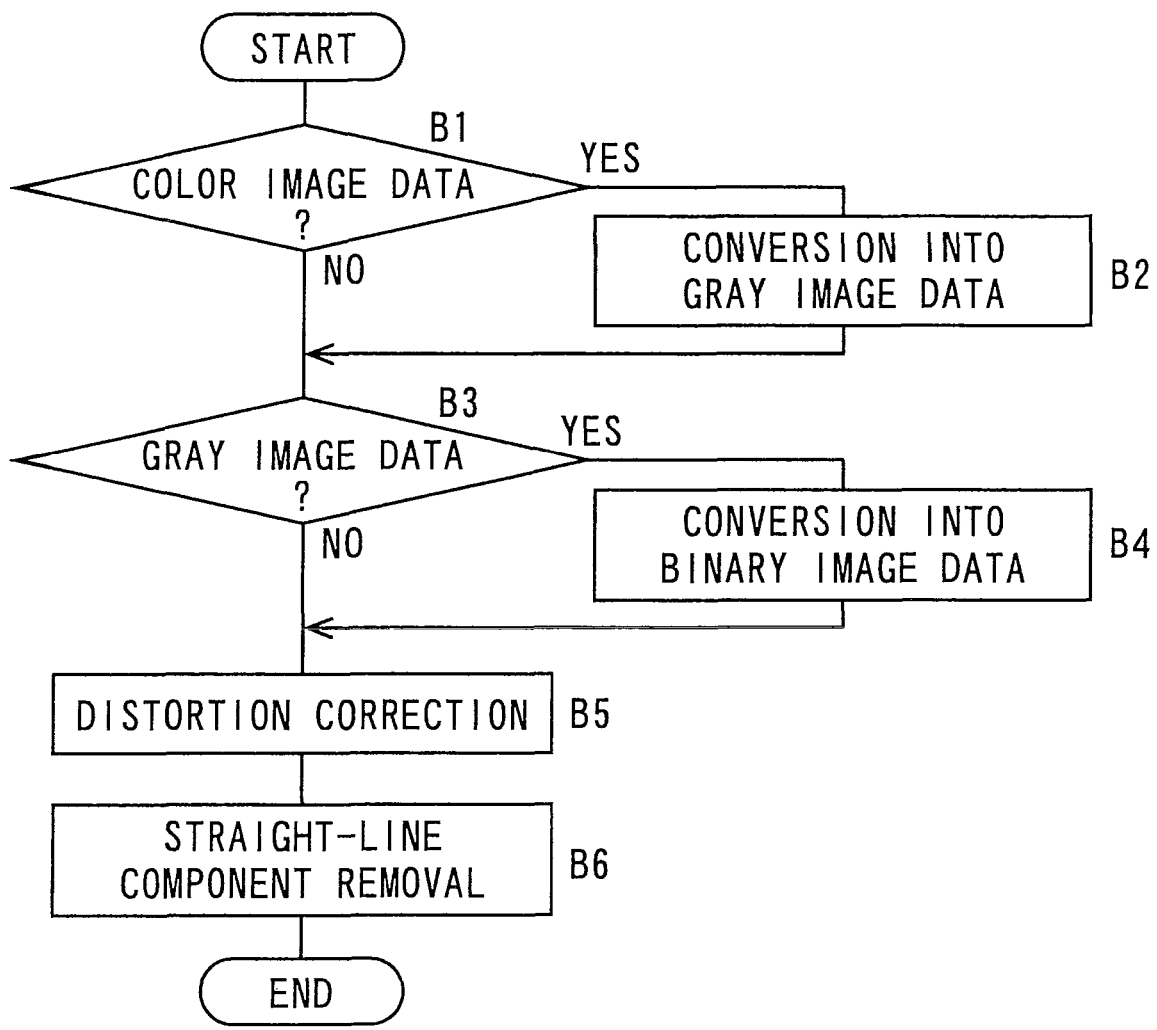
FIG. 5 is a flowchart illustrating a preprocessing performed in the preprocessing section shown in FIG. 3.

The preprocessing at step A1 performed in the preprocessing section 120 is illustrated, e.g., in the flowchart of FIG. 5.

When image data is inputted, in Step B1, whether or not the image data inputted is color image data is determined. When the image data inputted is color image data, the procedure proceeds to Step B2. In Step B2, the color image data is converted into gray image data by performing gray processing based on lightness components, and then the procedure proceeds to Step B3. When the image data inputted is not color image data, the procedure proceeds to Step B3. In Step B3, whether or not the image data is gray image data is determined. When the image data is gray image data, the procedure proceeds to Step B4. In Step B4, the gray image data is binarized by using a predetermined threshold value and the gray image data is converted into binary image data, and then the procedure proceeds to Step B5. When the image data is not gray image data, it means that the image data is binary image data and therefore the procedure proceeds to Step B5.

In Step B5, distortion correction is applied to the converted binary image data. To the distortion correction, correction processes known in the field of image processing can be applied.

In Step B6, straight-line components are removed. In order to avoid influence of long straight-line components in detecting connected components in the subsequent feature extraction stage, straight-line components are removed in advance in preprocessing.

Figure 6:
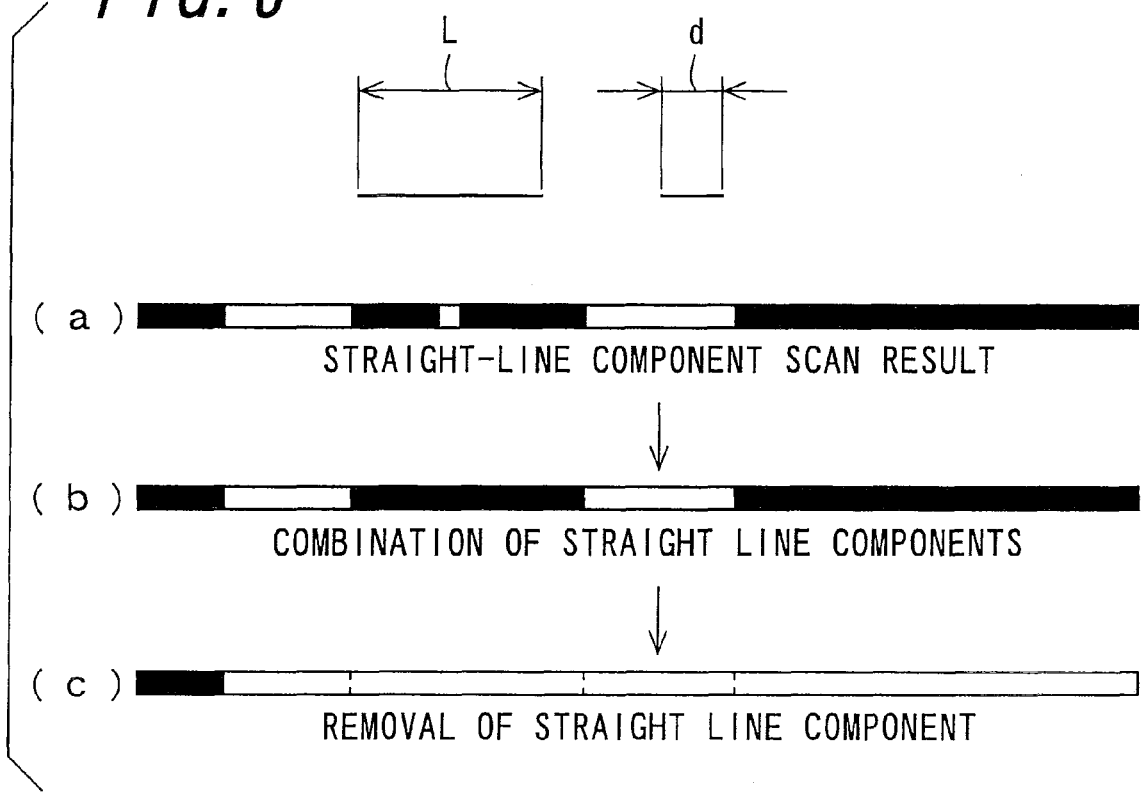
FIG. 6 is an illustration of processing for removal of straight-line components in Step B6 shown in the flowchart of FIG. 5.

FIG. 6 is an illustration of processing for removal of straight-line components in Step B6.

The binary image data is a so-called black-and-white image data generated by assigning either of pixel value 0 or 1 (either a white pixel or a black pixel) to each of pixels constituting the image data, wherein all the pixels are classified into black pixels or white pixels through threshold processing of the gray value (density) of each of the practical pixels in the gray image data.

A line scan of such binary image data provides a scan result as shown in FIG. 6(a) which includes connected portions of white pixels and those of black pixels. Herein, connected portions of black pixels are assumed as straight-line components.

Consequently, each connected portion of white pixels is thought to be a space between two lines. When the length of such a space portion is shorter than the predetermined length d, the connected portions on both sides of the space portion are combined together first. In other words, the white pixels in the space portion are converted into black pixels, and a new line as shown in FIG. 6(b) is formed. Then, lines longer than the predetermined length L are removed as shown in FIG. 6(c).

The binary image data obtained by removing the straight-line components in the foregoing manner is outputted.

Figure 7:
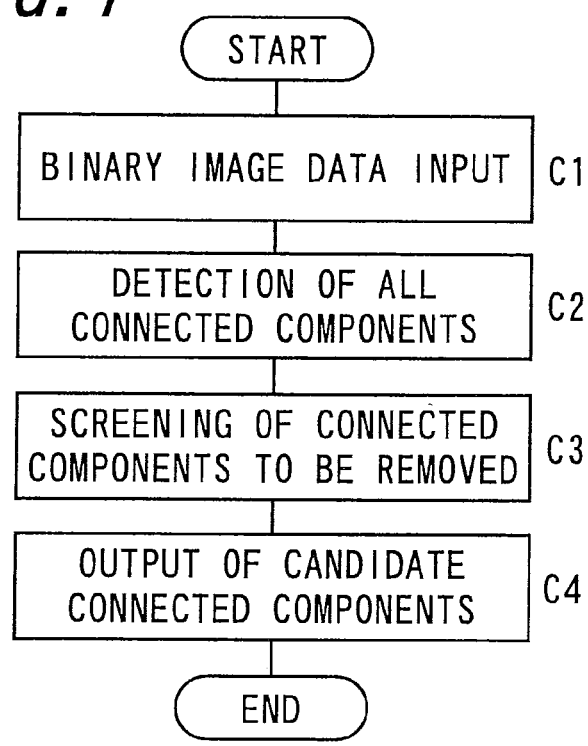
FIG. 7 is a flowchart illustrating a feature extracting processing performed in a feature extracting section shown in FIG. 3.

The feature extraction processing at Step A2 performed in the feature extracting section 121 is shown, e.g., in the flowchart of FIG. 7:

When the binary image data obtained by binarization in the preprocessing section 120 is inputted in Step C1, in Step C2, all the connected components in the binary image data are detected.

The connected component is a group of pixels having the same color and gathering in a connected state. Whether connected components to be detected are those of black pixels or those of white pixels depends on whether the background of the input image data is formed of black pixels or white pixels. In general, there are many cases where the background is formed of white pixels, while character images and figure images are drawn with black pixels. Therefore, detection of connected components of black pixels in this embodiment is illustrated below. In the cases where the background is formed of black pixels, character images and figure images are drawn with white pixels and they are outline characters and figures on the black background. In this case, connected components of white pixels are detected.

Incidentally, whether the background is formed of black pixels or white pixels can be determined by a known background determination processing. For instance, when a total black pixel ratio is smaller than a predetermined ratio, the background is recognized as being formed of white pixels, while when the total black pixel ratio is greater than the predetermined ratio, the background is recognized as being formed of black pixels.

Connected components can be detected by a known detection method. For example, a continuous portion of black pixels adjacent to each other (a black run) is detected in each line, and the run length of the black run and coordinates of the black pixels at both ends of the black run are stored in memory for every line. With respect to the coordinates, for example, the x-axis is fixed in advance in the direction parallel to each line and the y-axis in the direction orthogonal to the line.

With regard to black runs in upper and lower lines between which one line of interest is sandwiched in the y-axis direction, when the x coordinates of the black pixels at both ends of those black runs are within a range of the x coordinates of black pixel coordinates of each black run in the line of interest, the relevant black run in the line of interest and the black runs having as the end pixels the black pixels whose x coordinates are within the above-specified range can be regarded as being connected in the y-axis direction.

In the foregoing manner, while shifting the line of interest one by one, detection of connected portions in the x-axis direction and those in the y-axis direction are performed on all the image data, and connected components of black pixels are detected.

When connected components of black pixels are detected, circumscribing bounding boxes that circumscribe all the detected connected components, respectively, are generated. Each circumscribing bounding box is a bounding box having sides parallel to the x-axis direction and sides parallel to the y-axis direction. Here, the length of one side in the x-axis direction is referred to as the width of the bounding box and the length of one side in the y-axis direction as the height of the bounding box.

Each circumscribing bounding box can be generated by a known generation method. For example, since the coordinates of black pixels on both ends of each black run are already detected at the time of detection of every connected component, the minimum value and the maximum value of x coordinates of all the target black runs are extracted, and a difference between the maximum value and the minimum value is calculated as a width w of the bounding box (number of pixels). In addition, the minimum value and the maximum values of y coordinates of all the target black runs that make up each connected component are extracted, and a difference between the maximum value and the minimum value is calculated as a height h of the bounding box (number of pixels).

Based on the width w of the bounding box and the height h of the bounding box, areas of all the circumscribing bounding boxes are calculated, and the average S of these areas is calculated.

In the invention, the number P of black pixels among pixels in a circumscribing bounding box concerning every connected component is further calculated. The number P of black pixels can be calculated from the sum total of run lengths of all the black runs that make up each connected component.

In Step C2, the positions (coordinates) of black pixels that make up each connected component, the positions (coordinates) of each circumscribing bounding box, the width w and the height h of each circumscribing bounding box, the number P of black pixels and the average S of areas of all the circumscribing bounding boxes, which are calculated in the foregoing manners for all the connected components in the binary image data, are stored in a specified memory region in correlation with the respective connected component.

In the next Step C3, screening of connected components to be removed is carried out. The screening carried out herein aims to remove connected components having no contribution to the detection of a circular shape. The screening in Step C3, or the removal of connected components, is performed on connected components having circumscribing bounding boxes satisfying at least one condition of the following five conditions.

(Condition 1)

Connected components having the circumscribing bounding boxes that satisfy max(w, h)/min(w, h)>α1 are removed. The user can make the setting of α1 as appropriate. For example, α1 is set to 5.

(Condition 2)

Connected components having the circumscribing bounding boxes that satisfy P>α2×w×h are removed. The user can make the setting of α2 as appropriate. For example, α2 is set to 0.8.

(Condition 3)

Connected components having the circumscribing bounding boxes that satisfy P>α3×(w+h) are removed. The user can make the setting of α3 as appropriate. For example, α3 is set to 3.

(Condition 4)

Connected components having the circumscribing bounding boxes that satisfy min(w, h)<max(α4, α5×S) are removed. The user can make the settings of α4 and α5 as appropriate. For example, α4 is set to 50 and α5 is set to 3.

(Condition 5)

Connected components having the circumscribing bounding boxes that satisfy max(w, h)<w/α6 are removed. The user can make the setting of α6 as appropriate. For example, α6 is set to 3.

In the foregoing manner, connected components unnecessary for circular shape detection in the subsequent stage are screened and removed, and the residual connected components are selected as candidate connected components for circular shape detection.

By removal of connected components unnecessary for circular shape detection, not only the computing quantity in the determination processing at the subsequent stage can be reduced, but also the determination accuracy can be improved.

In Step C4, candidate connected components are outputted. The feature extracting section 121 outputs the candidate connected components obtained to the determination section 122.

In the determining section 122, whether or not a circular shape is contained in the input image data is determined based on the candidate connected components.

Information about the candidate connected components, which is outputted from the feature extracting section 121 to the determining section 122, includes positions (coordinates) of black pixels constituting the connected components necessary for edge map generation, positions (coordinates) of the circumscribing bounding boxes, and so on.

Figure 8:
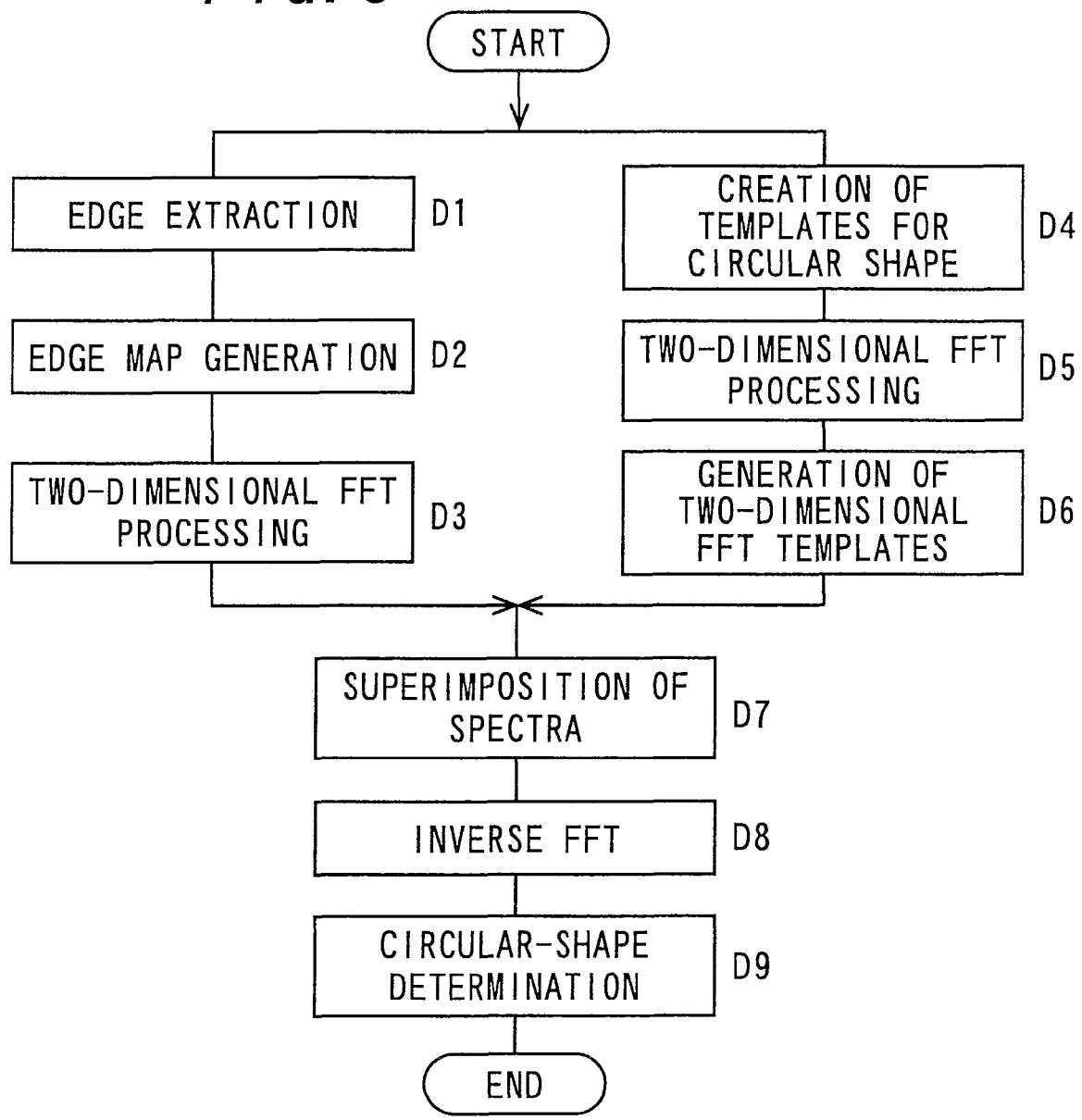
FIG. 8 is a flowchart illustrating a determination processing performed in a determining section shown in FIG. 3.

The determination processing at Step A3 performed in the determining section 122 is illustrated, e.g., in the flowchart of FIG. 8. In the determination processing, circular shape determination is made by using spectral data transformed to the frequency domain by performing fast Fourier transform based on the candidate connected components and spectral data obtained by performing fast Fourier transform on circular template images created separately.

In Steps D1 to D3, processing on candidate connected components is carried out, while in Steps D4 to D6, processing on templates is carried out.

In Step D1, edge extraction is performed on the candidate connected components, and in Step D2, edge map generation is performed by use of extracted edge pixels.

For the edge extraction and the edge map generation, a known method can be employed. To a pixel block centering on a pixel of interest and having a predetermined size, an edge detection operator is applied, and whether or not the pixel of interest is an edge pixel is determined by threshold processing.

In this embodiment, edge pixels are detected by using, e.g., a safe and optimum operator as the edge detection operator.

Candidate connected components are combined based on the edge pixels detected, and an edge map is generated by mapping the edge pixels.

In Step D3, two-dimensional fast Fourier transform processing (2D-FFT) is performed to the edge map generated in Step D2, and thereby spectral data is calculated.

FFT is the technique of computing spectral data by decomposing a one-dimensional signal into its frequency components and computing spectral data. In the image processing field, this technique is used for analyzing periodic changes in pixel alignment and shading. 2D-FFT is FFT performed on a two-dimensional image, and FFT is performed to vertical and lateral directions (x-axis and y-axis directions), respectively.

By the 2D-FFT processing, two-dimensional spectral data corresponding to the edge map is obtained. Incidentally, in performing the 2D-FFT processing, the size of the edge map is changed to a predetermined size (N pixels by N pixels).

In Step D4, on the other hand, plural pieces of circular template image data are created.

Image data whose size is N pixels by N pixels and whose pixels are all white pixels is created, and a circle having a radius of r and central coordinates of (r, r) is drawn. Herein, r is varied from R1 to Rn so that n template images are created.

In Step D5, the created n template images undergo 2D-FFT processing, and n pieces of two-dimensional spectral data corresponding to the n circular templates different in size, respectively, are obtained in Step D6.

The spectral data of the edge map and the spectral data of each template are stored in the predetermined memory regions.

In Step D7, the spectral data of the edge map and the spectral data of each of the n templates are superimposed upon each other and, in Step D8, inverse FFT is performed on the superimposed spectral data.

A coefficient of correlation between template and candidate connected component is obtained based on the post-superimposition function derived from the inverse FFT.

In Step D9, threshold processing is performed on the obtained coefficients of correlation and, the case where the coefficient of correlation is greater than the threshold value can be recognized as being a case where the circular shape contained in the superimposed template is contained also in the edge map. In other words, the same circular shape as contained in the superimposed template can be recognized as being contained in the input image data.

Based on the superimposed template, the radius and central coordinates of the circle contained in the input image data are determined.

By output processing at Step A4 in the determining section 122, determination results obtained in Step A3 are outputted to the search section 13.

In the search section 13, based on the circular shape recognized as being contained in the input image data, image data containing a specific image portion having a circular shape similar to that circular shape is searched from among the registration image data.

With respect to the registration image data, determination of whether or not the image data contains a specific image portion is performed at the time of registration and, when the specific image portion is contained, the determination result is stored in association with the template of the specific image portion.

From the determining section 122, information regarding the template of the specific image portion contained in the input image data is outputted, and the search section 13 performs a comparison between the template associated with the input image data and the template associated with the registration image data, and outputs the registration image data associated with the same or similar template as a search result.

As to the search result, not only the registration image data of the highest similarity but also certain pieces of registration image data, which are chosen in the decreasing order of similarity, may be outputted as search results.

When search results are outputted by the search section 13, the registration image data chosen as the search results are rendered as visible images and displayed by the display section 14.

According to the invention, the following effects can be achieved.

By performing the screening of connected components, unnecessary elements are removed in advance and the computing quantity in the determination processing is reduced, and thereby time required for determination processing and search processing can be shortened. In addition, since connected components causing false determination are removed in advance, determination accuracy can be improved.

Further, determination is performed by use of spectral data obtained through 2D-FFT, so even input image data accompanied by a complex background image can be determined with high accuracy.

The respective blocks of the image search apparatus 10, in particular, the input section 11, the image determination section 12, the search section 13, the display section 14, the registration image storing section 15 and the like can be configured by a hardware logic or implemented by a software with the use of a CPU as follows.

In other words, the image search apparatus 10 comprises: a CPU (central processing section) which executes a command of a control program for implementing the respective functions; a ROM (read only memory) which stores the program; a RAM (random access memory) which develops the program; a storage device such as a memory (recording medium) which stores the program and a variety of data, and the like. The object of the invention can be achieved too in such a manner that the recording medium on which the program code of the control program of the image search apparatus 10 which program code is a software which implements the functions as described above (an executable program, intermediate-ode program, and source program) is recorded to be read by a computer is provided to the image search apparatus 10, and the computer (or CPU or MPU) reads and executes the program code recorded on the recording medium.

Examples of the recording medium to be used include tape type media such as a magnetic tape or cassette tape; disk type media including a magnetic disk such as a floppy (registered trade mark) disk or hard disk or an optical disk such as a CD-ROM/MO/MD/DVD/CD-R; card type media such as an IC card (including a memory card)/optical card; and semiconductor memory media such as a mask ROM, EPROM, EEPROM, or flash ROM.

Further, it is possible that the image search apparatus 10 is configured in order to make it connectable to the communication network and providing the program code through a communication. The communication network which is not particularly limited, may be selected, for example, from Internet, intranet, extranet, LAN, ISDN, VAN, CATV communication network, virtual private network, telephone line network, mobile communication network, satellite communication network, and the like. A transmission medium constituting the communication network is not particularly limited, which may be either wired or wireless. The wired medium includes IEEE1394, USB, power-line carrier, cable TV line, telephone line, ADSL line, and the like. The wireless medium includes infrared light used for IrDA or a remote control, Bluetooth (registered trademark), 802.11 wireless network, HDR, a cellular phone network, a satellite connection, digital terrestrial network, and the like. In addition, the present invention can be realized also by using computer data signal embedded in the carrier wave, which is realized by electronic transmission of the aforementioned program codes.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image determination apparatus for determining whether or not an image portion having a specific shape is contained in input image data, comprising:
a processor operably performing the functions of:
a binarization processing section that converts input image data into binary image data by binarization;
a feature extracting section that detects connected components contained in the binary image data, each of which is a group of pixels having the same color and gathering in a connected state, detects circumscribing bounding boxes that circumscribe the connected components, respectively, removes predetermined connected components from all the connected components based on the sizes of the circumscribing bounding boxes and the numbers of black pixels in the circumscribing bounding boxes, and extracts the residual connected components as candidate connected components; and
an image determination section that determines whether or not the image portion having the specific shape is contained in the input image data based on spectral data corresponding to the input image data and spectral data corresponding to each of plural pieces of template image data, wherein, while the spectral data corresponding to the input image data is generated by carrying out detection of edges on the extracted candidate connected components, generating distribution data of edge pixels contained in the binary image data and subjecting the generated distribution data to two-dimensional fast Fourier transform, the spectral data corresponding to each of plural pieces of template image data is generated by creating plural pieces of template image data having specific shapes geometrically similar but different in size, and subjecting each of the plural pieces of created template image data to two-dimensional fast Fourier transform.

2. The image determination apparatus of claim 1, wherein the image determination section superimposes the spectral data corresponding to the input image data upon the spectral data corresponding to each template image data, calculates a coefficient of correlation between the input image data and the template image data is calculated by applying the inverse transform of the two-dimensional fast Fourier transform to the superimposed spectral data and determines, based on the calculated coefficient of correlation, whether or not an image portion having the specific shape is contained in the input image data.

3. The image determination apparatus of claim 1, wherein the specific shape is a circular shape and the plural pieces of template image data are plural pieces of image data in which circular shapes having different radii are contained, respectively.

4. An image search apparatus for searching for image data similar to input image data from among pre-registered image data, comprising:

a processor operably performing the functions of:

a binarization processing section that converts input image data into binary image data by binarization;

a feature extracting section that detects connected components contained in the binary image data each of which is a group of pixels having the same color and gathering in a connected state, detects circumscribing bounding boxes that circumscribe the connected components, respectively, removes predetermined connected components from all the connected components based on the sizes of the circumscribing bounding boxes and the numbers of black pixels in the circumscribing bounding boxes, and extracts the residual connected components as candidate connected components;

an image determination section that determines whether or not the image portion having the specific shape is contained in the input image data based on spectral data corresponding to the input image data and spectral data corresponding to each of plural pieces of template image data, wherein, while the spectral data corresponding to the input image data is generated by carrying out detection of edges on the extracted candidate connected components, generating distribution data of edge pixels contained in the binary image data and subjecting the generated distribution data to two-dimensional fast Fourier transform, the spectral data corresponding to each of plural pieces of template image data is generated by creating plural pieces of template image data having specific shapes geometrically similar but different in size, and subjecting each of the plural pieces of created template image data to two-dimensional fast Fourier transform;

a search section that searches for image data having an image portion similar to the image portion of the specific shape contained in the input image data based on determination result in the image determination section; and a display section that displays image data similar to the input image data, searched from among the pre-registered image data based on search result in the search section.

5. The image search apparatus of claim 4, wherein the per-registered image data is distinguished, when it is registered, by whether or not it has an image portion of the specific shape, and template image data showing the specific shape contained in the input image data is determined, the image determination section outputs information about the template image data showing the specific shape contained in the input image data, and the search section searches based on the information about template image data contained in determination result in the image determination section and the information about the template image data decided in advance in relation to the pre-registered image data.

6. A non-transitory computer-readable recording medium storing an image search program for making a computer function as the image search apparatus of claim 4.

* * * * *